US009382937B2

(12) United States Patent
Davies

(10) Patent No.: US 9,382,937 B2
(45) Date of Patent: Jul. 5, 2016

(54) LOCK NUT ASSEMBLY

(71) Applicant: Brian Investments Pty Ltd, Belmont (AU)

(72) Inventor: Brian Davies, Esperance (AU)

(73) Assignee: Brian Investments Pty Ltd, Esperance (AU)

( * ) Notice: Subject to any disclaimer, the term of this patent is extended or adjusted under 35 U.S.C. 154(b) by 181 days.

(21) Appl. No.: 14/169,293

(22) Filed: Jan. 31, 2014

(65) Prior Publication Data
US 2014/0144003 A1    May 29, 2014

Related U.S. Application Data

(63) Continuation of application No. PCT/AU2012/000929, filed on Aug. 3, 2012.

(51) Int. Cl.
*F16B 39/12*   (2006.01)
*F16B 39/22*   (2006.01)
*F16B 39/34*   (2006.01)

(52) U.S. Cl.
CPC ............... *F16B 39/12* (2013.01); *F16B 39/22* (2013.01); *F16B 39/34* (2013.01); *Y10T 29/49948* (2015.01)

(58) Field of Classification Search
CPC ........ F16B 31/021; F16B 39/12; F16B 39/22; F16B 39/34
USPC ..................... 411/1–3, 5, 204, 214, 222, 223
See application file for complete search history.

(56) References Cited

U.S. PATENT DOCUMENTS

| 252,868 | A | * | 1/1882 | Denison | F16B 39/12 285/148.27 |
| 659,215 | A | * | 10/1900 | Doelp | F16B 39/32 411/222 |
| 838,917 | A | * | 12/1906 | Treadwell | F16B 39/12 279/100 |

(Continued)

FOREIGN PATENT DOCUMENTS

| EP | 1163959 B1 | 4/2006 |
| FR | 968399 A | 11/1950 |

(Continued)

OTHER PUBLICATIONS

Extended European Search Report for European Application No. 12820172.0, mailed Dec. 1, 2014.

(Continued)

*Primary Examiner* — Roberta Delisle
(74) *Attorney, Agent, or Firm* — Fish & Richardson P.C.

(57) ABSTRACT

A lock nut assembly 10, 10' has a first component 12 provided with a threaded axial through hole 19; and a second component 14 provided with an axial hole 31. The first and second components 12, 14 are detachably coupled together and arranged so that both components are simultaneously engagable with a common tool to effect application of the assembly 10, 10' onto a threaded member 22 by operation of the tool to impart torque to the assembly 10, 10' in a first direction. The first component 12 initially engages the threaded member 22 with the second component 14 following. The first component 12 provides fastening to the threaded member 22 and is torqued as required. The second component 14 acts to lock the first component 12 onto the threaded member 22.

13 Claims, 13 Drawing Sheets

(56) References Cited

U.S. PATENT DOCUMENTS

| | | | | |
|---|---|---|---|---|
| 909,033 | A | * | 1/1909 | Smith ................... F16B 39/12 411/222 |
| 1,235,594 | A | * | 8/1917 | Post ..................... F16B 39/12 411/223 |
| 1,443,751 | A | * | 1/1923 | Lafever ................. F16B 39/24 411/223 |
| 1,624,764 | A | * | 4/1927 | Sale ..................... F16B 39/12 411/294 |
| 1,798,604 | A | * | 3/1931 | Hoke .................... F16B 39/30 411/222 |
| 1,904,263 | A | * | 4/1933 | Berge ................... F16B 37/14 411/135 |
| 1,905,869 | A | * | 4/1933 | Hoke .................... F16B 39/30 411/222 |
| 2,288,710 | A | * | 7/1942 | Hotchkin .............. F16B 37/02 411/374 |
| 2,313,763 | A | | 3/1943 | Olsen |
| 2,334,046 | A | * | 11/1943 | Tinnerman ........... F16B 37/02 411/374 |
| 2,450,694 | A | | 10/1948 | Sauer |
| 2,587,560 | A | | 2/1952 | Widmer |
| 2,889,733 | A | * | 6/1959 | Vanderhoof .......... F16B 33/004 277/622 |
| 3,174,522 | A | | 3/1965 | Larentis et al. |
| 3,444,775 | A | * | 5/1969 | Hills .................... F16B 31/021 411/3 |
| 5,154,560 | A | * | 10/1992 | Copito .................. F16B 39/12 411/222 |
| 5,855,463 | A | | 1/1999 | Newby |
| 2002/0192052 | A1 | * | 12/2002 | Ruspa .................. F16B 37/14 411/431 |
| 2005/0286988 | A1 | * | 12/2005 | Harris ................... F16B 39/24 411/149 |
| 2008/0226411 | A1 | * | 9/2008 | McKinlay ............. B60B 3/145 411/2 |

FOREIGN PATENT DOCUMENTS

| | | |
|---|---|---|
| JP | 2000035025 A | 2/2000 |
| JP | 2000274417 A | 10/2000 |

OTHER PUBLICATIONS

International Search Report for International Application No. PCT/AU2012/000929, mailed Dec. 21, 2012.
International Preliminary Report on Patentability for International Application No. PCT/AU2012/000929, mailed Sep. 3, 2013.
Patent Examination Report No. 1 for Australian Application No. 2013203796, mailed Apr. 14, 2015.
First Office Action for Chinese Application No. 201280038418.0, mailed Apr. 3, 2015, with English Translation.
Second Office Action for Chinese Application No. 201280038418.0, mailed Nov. 5, 2015, with English Translation.

* cited by examiner

LOCK NUT ASSEMBLY

FIELD OF THE INVENTION

The present invention relates to a lock nut assembly.

BACKGROUND OF THE INVENTION

There are many well-known methods or arrangements for locking a nut onto a threaded shaft such as a bolt or stud. For example it is known to use a liquid adhesive locking compound such as LOCTITE™ adhesive. Other arrangements include simply using two nuts where a first nut is used for tightening either to a prescribed torque or to provide a required tension on the threaded bolt or shaft, and a second nut which is subsequently screwed onto the shaft to lock the first nut in place. Another well-known lock nut is the prevailing torque nut. In one form this type of lock nut incorporates an elastic sleeve or ring often made from nylon or other polymer. In these types of lock nuts, the ring elastically deforms when the nut is applied which has the effect of resisting loosening under vibrations. Other lock nut arrangements or assemblies include castellated nuts which are secured in place by cotter pins or safety wire is passed through a hole drilled transversely through the shaft onto which the nut is applied.

SUMMARY OF THE INVENTION

In one aspect the invention provides a lock nut assembly comprising:
   a first component provided with a threaded axial through hole; and
   a second component provided with an axial hole;
   the first and second components being detachably coupled together and arranged so that both components are simultaneously engagable with a common tool to effect application of the assembly onto a threaded member by operation of the tool to impart torque to the assembly in a first direction with the first component initially engaging the threaded member and the second component acting to lock the first component on the threaded member.

In one embodiment the assembly is configured to have an axial length to enable the lock nut assembly to wholly cover an exposed length of a threaded member onto which the lock nut assembly is to be applied.

In one embodiment the second component comprises a closure member over an end distant the first component.

In one embodiment the closure member is provided with a breather hole or a valve to enable escape of fluid from between the lock nut a threaded shaft on to which the lock nut is screwed down.

In one embodiment the lock nut assembly comprises a volume of a corrosion prevention material disposed in one or both of the first component and the second component.

In one embodiment the second component in a region forming or surrounding its axial hole consists of or comprises a body made of a material that elastically deforms when engaged by the threaded member.

In one embodiment the lock nut assembly comprises an elastic material detachably coupling the first and second components together with their holes in axial alignment.

In one embodiment the lock nut assembly comprises a pliable material or a frangible material detachably coupling the first and second components together with their holes in axial alignment. Non limiting examples of the pliable material or frangible material include: adhesive tape that can adhere the first and second components together; a sleeve made of a plastics material that fits over at least a portion of both the first and second components.

In one embodiment a thread of the threaded axial through hole has a major diameter $D1$ and a minor diameter $D2$ where $D1>D2$, and a locking portion of the axial hole in the second component has an inner diameter $D3<D1$ wherein the locking portion is arranged to elastically deform on engagement with the threaded member.

In a second aspect the invention provides a lock nut assembly comprising:
   a first component in the form of a nut having a threaded axial through hole;
   a second component provided with an axial hole; and
   a material detachably coupling the first component and the second component together with the threaded axial through hole of the first component in axial alignment with the axial hole of the second component.

In one embodiment the material comprises an elastic material detachably coupling the first and second components together with their holes in axial alignment. In another embodiment the material may comprise a pliable material or a frangible material detachably coupling the first and second components together with their holes in axial alignment. Non limiting examples of the pliable material or frangible material include: adhesive tape that can adhere the first and second components together; and a sleeve made of a plastics material that fits over at least a portion of both the first and second components. In one example the sleeve may be a shrink wrap sleeve.

In one embodiment the material is provided in a quantity to space the first and second components from each other by a distance $Dmm$ prior to application of the components onto a threaded member and to enable the distance $Dmm$ to be expanded by a distance of up to $Lmm$ where $L$ is the lead of a thread on the second components without wholly detaching the first components from the second components.

In one embodiment the second component comprises a prevailing torque nut.

In one embodiment the lock nut assembly comprises a volume of a corrosion prevention material disposed in one or both of the first and second components.

In one embodiment the material forms a water proof seal between the first and second components.

In one embodiment the material is provided as a plurality of circumferentially spaced apart portions or sections.

In one embodiment the first component has an axial length half of that of the second component.

In one embodiment the second component is a dome nut.

In one embodiment the lock nut assembly comprises a washer attached to an end of the first component distant the second component.

In one embodiment the lock nut assembly comprises a quantity of a further elastic material attaching the washer to the first component.

In a third aspect there is provided a lock nut assembly comprising:
   a first component having an axial through hole provided with a screw thread with a major diameter $D1$ and a minor diameter $D2$ where $D1>D2$; and
   a second component having a second axial hole contiguous with the axial through hole, the components being simultaneously engagable with a common tool to effect application of the assembly onto a threaded member by operation of the tool to impart torque to the assembly in a first direction, wherein locking portion of the axial hole in the second component has an inner diameter $D3<D1$ wherein the locking portion is arranged to elastically deform on engagement with the threaded member.

In one embodiment of the first or third aspects $D3 \geq D2$.

In one embodiment of the first or third aspects $D3=D2$.

In one embodiment of the first or third aspects axial hole in the second component has a further portion of an inner diameter $D4>D3$.

In one embodiment of the first or third aspects $D4 \geq D1$.

In one embodiment of the first or third aspects the locking portion of second axial hole is contiguous with the axial through hole.

In one embodiment of the first or third aspects the further portion extends from the locking portion to an end of the second component distant the first component.

In one embodiment of the first or third aspects the first component and the second component are demountably coupled together in a manner wherein rotation of the second part in the second direction relative to the first component facilitates decoupling of the second component form the first component.

In one embodiment of the first or third aspects the first component and the second component inter-fit with each other.

In one embodiment of the first or third aspects the first component and the second component inter-fit by provision of respective coupling portions which fit one within the other.

In one embodiment of the first or third aspects the coupling portions are provided with cooperating threads.

In one embodiment of the first or third aspects the coupling portion of the first component is provided with a screw thread and is pressed onto the coupling portion of the second component.

In one embodiment of any aspect each of the first component and the second component is provided with at least two flat faces arranged to enable engagement with the tool.

In one embodiment of the first or third aspects the first component is made of metal and the second part is made of a plastics material.

In one embodiment of any aspect the closure is provided with one or more lines of weakness arranged to enable rupturing of the closure along the lines of weakness by the threaded member when a portion of the threaded member onto which the lock nut assembly is screwed down is greater than a length of the lock nut.

In one embodiment of any aspect the second component is configured to enable the lock nut assembly to enclose the threaded member when the lock nut assembly is fully screwed down onto the threaded shaft.

In a fourth aspect of the invention there is provided a method of locking a first nut on a threaded member comprising:

engaging the lock nut assembly comprising first nut detachably coupled to a second nut by an elastomeric material in or with tool wherein the tool is able to simultaneously apply torque to both the first and second nuts;

using the tool to screw the lock nut assembly onto the threaded member and to apply a prescribed torque to the first nut;

disengaging the first nut from the tool; and, tightening the second nut onto first nut on the threaded member to compress the elastomeric material and cause the elastomeric material to be forced in a radial direction between the first and second nuts.

In one embodiment the method comprises configuring the lock nut assembly to have an axial length dimensioned to wholly cover a circumferential surface of a free length of the thread member onto which the lock nut assembly is applied.

In one embodiment the method comprises providing a second nut as a prevailing torque nut.

In one embodiment the method comprises providing a volume of an anticorrosion material in the lock nut assembly prior to applying the lock nut assembly to the threaded member.

BRIEF DESCRIPTION OF THE DRAWINGS

Embodiments of the present invention will now be described by way of example only with reference the accompanying drawings in which.

DETAILED DESCRIPTION OF THE PREFERRED EMBODIMENTS

Figure 1:
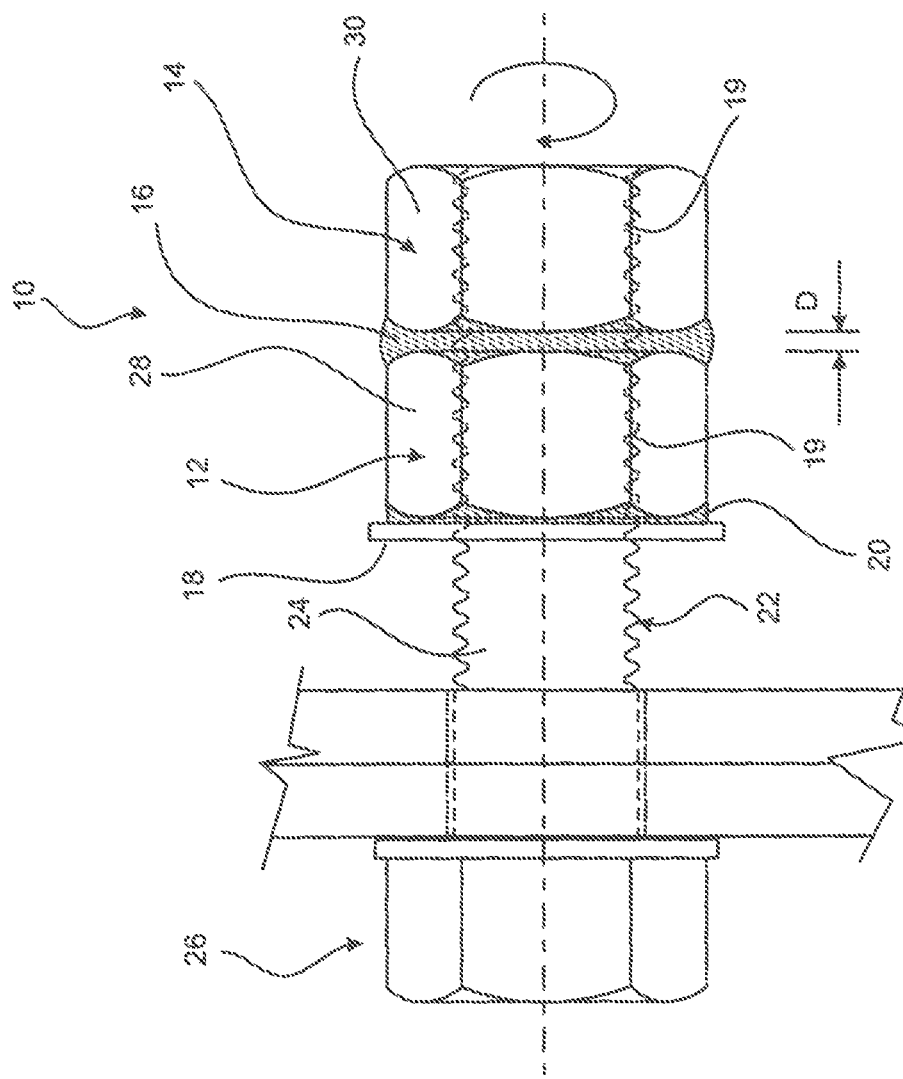
FIG. 1a is a side view of an embodiment of a lock nut assembly in accordance with the present invention being applied to a bolt.
FIG. 1b is an end view of the lock nut assembly shown in FIG. 1.
Figure 2:
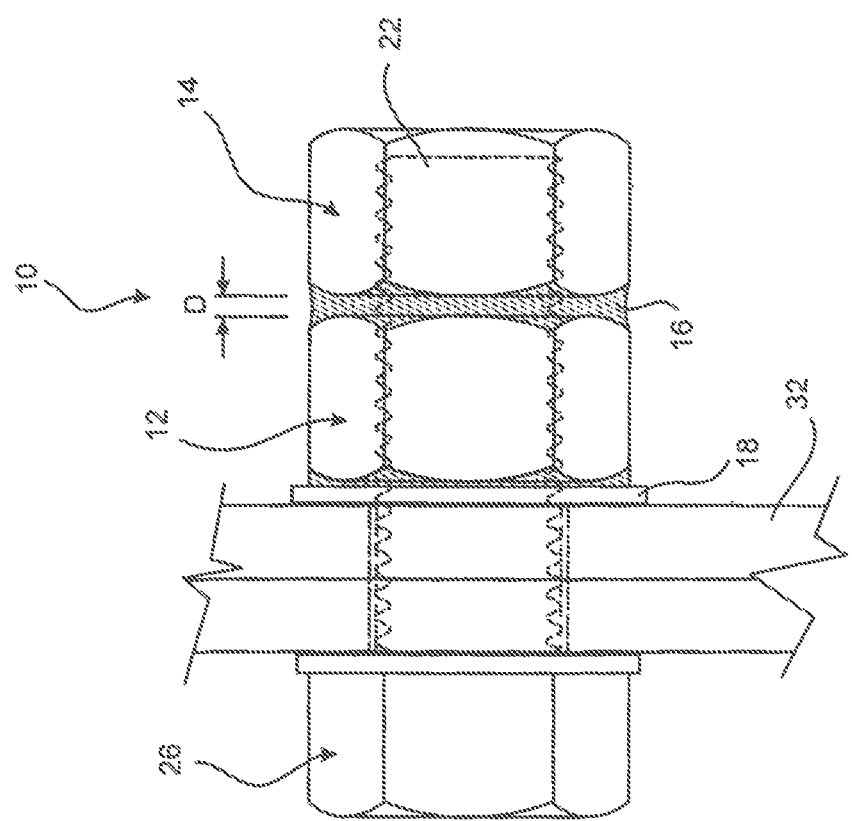
FIG. 2 illustrates the lock nut assembly shown in FIG. 1 with both first and second nuts of the assembly threaded on the bolt but prior to the first nut of the assembly being fully torqued onto the bolt.

The following describes several embodiments of a lock nut assembly 10. Two of these embodiments are depicted in FIGS. 1 a and 7. In a general sense, in each of these embodiments the lock nut assembly 10 comprises a first component 12 provided with a threaded axial through hole. The first threaded component 12 may be in the form of a conventional threaded hexagonal nut. Each of these embodiments also comprises a second component 14 which is provided with an axial hole. In one example the axial hole in the second component 14 may be a through hole, but in an alternate example the axial hole may be a blind hole. A blind hole can be formed by closing an otherwise through hole one end of the component 14. Further, in some embodiments the axial hole in the second component 14 is provided with a screw thread but in other embodiments the axial hole is not be provided with a screw thread. In the embodiments of the assembly 10, the first and second components 12 and 14 are detachably coupled together and arranged so that both components can be simultaneously engaged by a common tool such as a rattle gun or socket wrench. In this way, the tool can be operated to apply the assembly 10 onto a threaded member 22 such as the threaded shaft of a bolt. When the assembly 10 is applied to the thread member 22, the first component 12 constitutes a lead component and engages the thread member 22 first. The first component 12 may be screwed down to a required torque to provide a desired tensile force to the thread member 22. The second component 14 has a function of locking the first component 12 onto the threaded member 22. In one method of removing the assembly 10, the second component 14 is engaged by itself with a tool and unscrewed from the member 22. This action detaches the second component 14 from the first component 12. As the first component 12 is retained on the threaded member 22 with its initial torque, the second component 14 can be detached from the first component and removed with substantially no risk of the threaded member 22 turning with the second component 14. This is particularly useful in the event that a head of the threaded member is inaccessible or otherwise cannot be gripped or held. With the second component 14 detached, the first component 12 can now be removed as it is now free from the previously applied locking component 14. As will be further described hereinafter, the assembly 10 may be configured to wholly cover the thread member 22 and thus provided protection to its screw thread. As a consequence, the component 12 is generally relatively easy to unscrew as the thread on threaded member 22 is protected from damage either by way of rust, corrosion, or mechanical damage.

Specific embodiments of the lock nut 10 will now be described in greater detail.

FIG. 1 illustrates a first embodiment of the lock nut assembly 10 in accordance with the present invention. The lock nut assembly 10 comprises a first component in the form of first nut 12, a second component in the form a second nut 14 which is axially aligned with nut 12. The nuts 12 and 14 are detachably coupled together in this embodiment by an elastic or elastomeric material 16 provided between and bonding the first and second nuts 12 and 14 together. The elastic material may be in the form of a settable compound that adheres to the first and second components. Due to the material 16 being disposed between the nuts 12 and 14 they are in an axially spaced relationship. The nuts 12, 14 have identical internal screw threads 19. In this particular embodiment the lock nut assembly 10 is shown as including an optional washer 18 which is attached to the first nut 12 by a further volume of elastomeric material 20. The washer 18 has a central hole in axial alignment with the first and second nuts 12 and 14. The thread 19 on nuts 12, 14 is configured to mate with the thread on a threaded member 22 which in this embodiment comprises a shaft 24 of a bolt 26.

The elastic/elastomeric material 16 is provided in volume or configuration to space the first and second nuts 12 and 14 by a distance D millimeters. In one embodiment the distance D may be in a range of 1-5 mm. In a further embodiment the distance D may be in the range of 2-4 mm. In a further embodiment the distance D may be in the order of 3 mm. However the distance D may also be described or arranged in terms of the pitch P of the thread on the second nut 14. For example the distance D may be in the order of one to two times the pitch.

The elastic nature of material 16 enables the distance D to be varied and in particular extended and/or reduced during various stages of the application of the lock nut assembly 10 on the threaded member 22. In this regard, it is envisaged that the distance D may be expanded by a distance in the order of the thread pitch P on the second nut 14. In other embodiments the expansion of the distance D may be in the order of the lead L of the thread on the second nut 14. This is the same as the lead of the first nut 12. Throughout this specification the term "lead" when used in relation to a screw thread is intended to denote the linear distance along a thread's axis that is covered by one complete rotation of the screw. The term "pitch" is intended to denote the distance in the axial direction from the ridge of one thread to the next. For a screw thread having a single start thread form, the lead and pitch are the same. However for a thread has N number of starts then $L=NP$ where P is the pitch.

The general idea behind the provision of the material 16 (whether this be an elastic material as in the current embodiment or a pliable or frangible material such as an adhesive tape or plastics sleeve in alternate embodiments) is enable the following functions. Firstly it detachably couples the nuts 12 and 14 together so that the assembly 10 is a single unit that can be applied to the threaded member 22 in a single action. Secondly it enables expansion of the distance between the nuts 12 and 14 to enable the thread on the nut 14 to align with the thread on threaded member 22. Thirdly it allows the nut 14 to be torqued separately from and compressed onto nut 12 to provide a locking function for the nut 12. This will usually result in a shearing or otherwise detaching of the material previously coupling the nuts 12, 14. Accordingly notwithstanding the above examples where there is an initial separation distance D due to the type of material used, the distance D is more governed by a requirement to facilitate the above functions rather than being determined by a precise mathematical relationship.

Nuts 12 and 14 in the present embodiment are hexagonal nuts. When the nuts 12 and 14 are joined together the planar faces 28 of nut 12 are in mutual alignment with planar faces 30 of nut 14. This enables a socket tube to receive both the first and second nuts 12, 14 when applying the lock nut assembly 10 to the member 22. It should be noted however in this configuration there is no guarantee that the start of the thread on nut 14 will be correctly aligned to engage the thread on the threaded member 22 when the nut 14 first contacts the thread on member 22 following the engagement of nut 12 on the member 22.

To apply the lock nut assembly, the assembly is either: initially threaded by hand onto member 22 with the washer 18 leading and then a tube socket is fitted over the first and second nuts 12, 14; or, the assembly 10 is engaged with a tube socket that receives both nuts 12, and 14 with the washer 18 adjacent the opening of the tube socket and then the tube socket is rotated to engage the lock nut assembly on the member 22. When the assembly 10 is screwed down to the point where nut 14 first contacts the member 22 the assembly maintains its initial configuration. However thereafter this configuration may vary subsequent to nut 14 contacting the member 22, and will vary upon fully torquing the nut 14 onto nut 12. Consider the situation when the nut 14 first contacts the member 22 following the threading of nut 12 on member 22. In the event that the start of thread on nut 14 is not properly aligned with the thread on member 22, the continued rotation of the lock nut assembly 10 onto the member 22 will result in an elastic extension of the elastomeric material 16 thereby increasing the distance D between nuts 12 and 14. This occurs because nut 12 continues to advance along member 22 but nut 14, while rotating on member 22, does not engage the thread on member 22 and therefore does not advance with nut 12. Eventually however as the entirety of lock nut assembly 10 is being rotated by the tube socket, the beginning of thread 14 will engage the beginning of thread on the thread member 22. During this process the distance D between nuts 12 and 14 increases and the elastomeric material 16 expands.

In one example where the nut 14 has a single start thread with a pitch P (and lead L) of 2 mm, then the maximum expansion of the elastomeric material 16 and increase in distance D will also be 2 mm. If the elastomeric material 16 is provided in a volume to initially space the nuts 12 and 14 by a distance of 3 mm prior to application of the lock nut assembly 10 onto the thread member 22, then at most, the distance between nuts 12 and 14 will expand to 5 mm in the above example.

The material 16 is arranged to allow for this expansion without wholly detaching from either one of the nuts 12 and 14.

Now that the thread on nut 14 has engaged the thread on member 22, the lock nut assembly 10 is screwed further screwed down onto member 22 using the tube socket until washer 18 abuts an article such as a plate 32 through which the bolt 26 extends and the appropriate torque is applied to nut 12. This will also have the effect of compressing the elastomeric material 20. However the gap spacing between nuts 12 and 14 will remain constant during this process.

Figure 3:
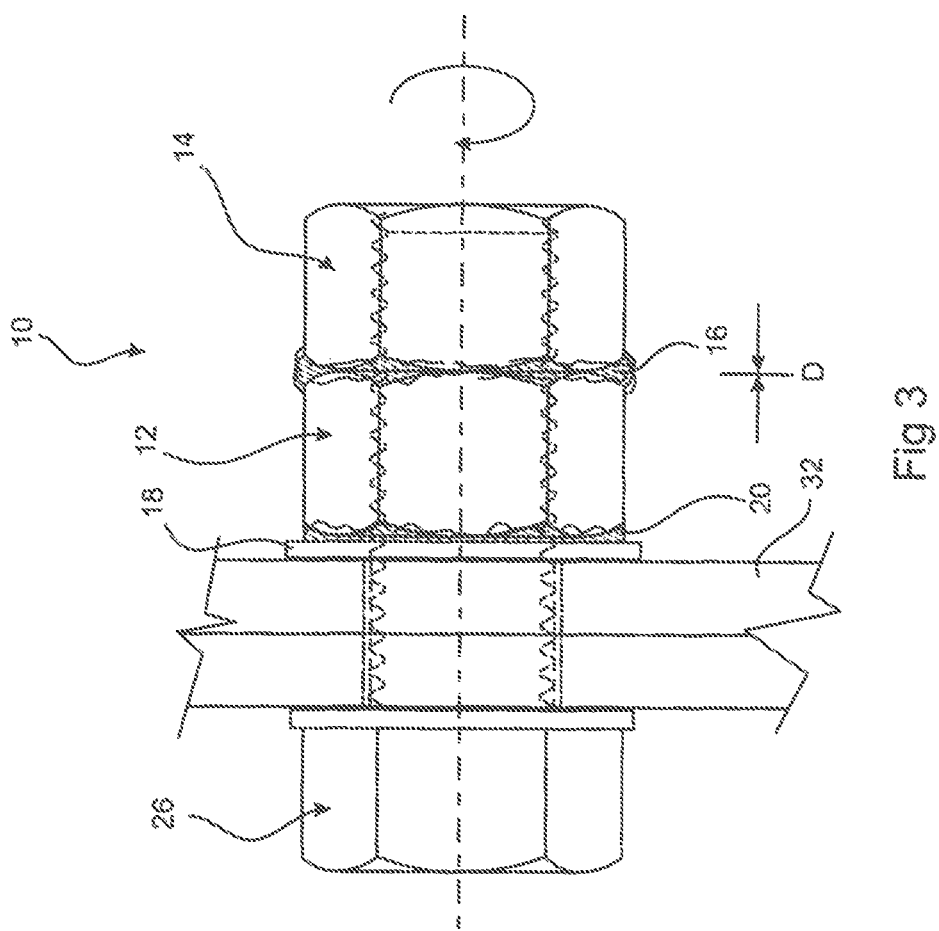
FIG. 3 illustrates the lock nut assembly when fully applied to the bolt with the first and second nuts fully torqued.

To complete the application of lock nut assembly 10, the tube socket is now disengaged from nut 12 and either: held in engagement with nut 14 only, or alternately a different spanner or wrench is applied to nut 14 only. Nut 14 is now screwed down onto member 12 compressing the elastomeric material 16 and forcing it in a radial direction between nuts 12 and 14. This is shown in FIG. 3. In this way the nut 14 now acts as a normal lock nut, preventing loosening of the nut 12.

It is expected that the elastomeric material 16 will shear from one or both of nuts 12 and 14 as nut 14 is tightened onto nut 12. A portion of the material 16 may remain between nuts 12 and 14 and possibly act as a sealing gasket to form a water tight seal there between. However this is not a critical function of the material 16. In any event it is envisaged that face to face contact between nuts 12 and 14 may provide an effective barrier to water or other liquid penetrating to the member 22.

It will also be noted from FIG. 3 that the assembly 10 is dimensioned so that the circumferential surface of thread on member 22 is wholly within the lock nut assembly 10. Thus the thread on the member 22 is protected from corrosion and damage. The protection to corrosion can be further aided by the application of a corrosion protection/prevention material in the assembly 10 prior to screwing onto member 22. The provision of this corrosion protection material obviates the need for a waterproof seal between the nuts 12, 14 prior to or after application of the assembly 10 on the member 22.

The protection of the thread on member 22 is significant in terms of being able to remove the lock nut assembly 10. In instances where say a single nut is used so that a portion of the thread on member 22 extends beyond a nut there is a possibility of the thread being corroded or otherwise damaged for example by impact with hard objects. At times this makes removal of the nut 12 extremely difficult if not impossible without cutting the extending portion of the member 22 from the bolt 26. This of course renders the bolt 26 useless for re-use.

Figure 4:
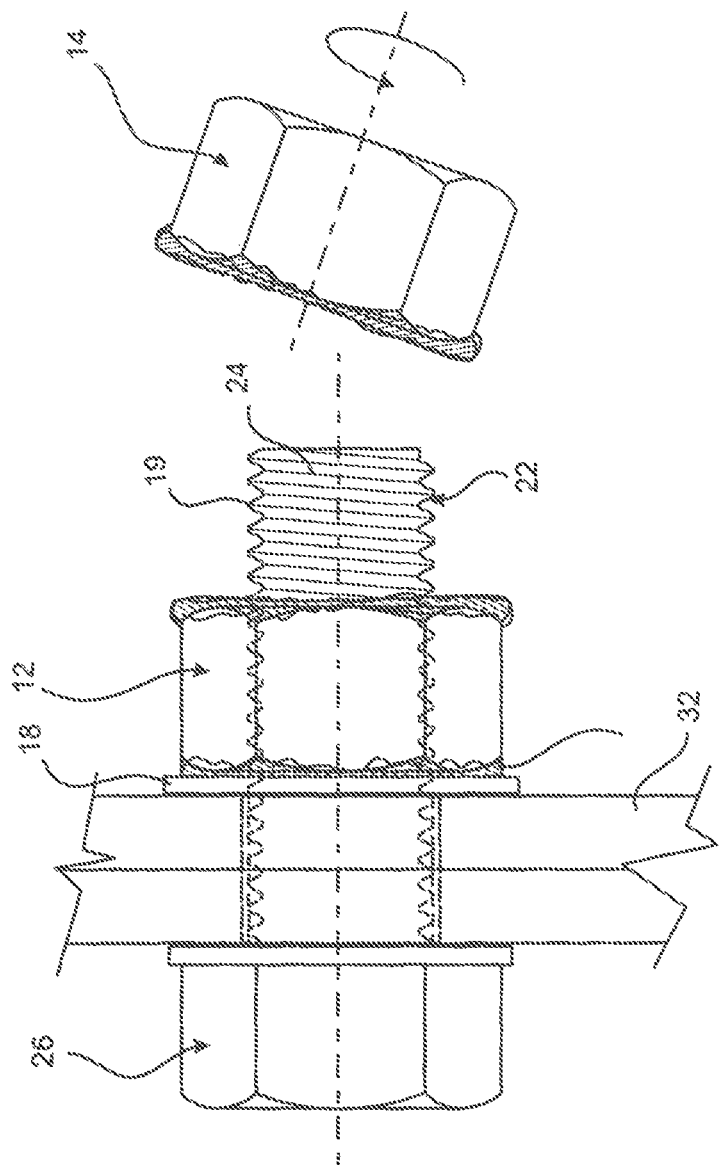
FIG. 4 illustrates a method of removal of the lock nut assembly from a bolt.

In contrast, and as shown in FIG. 4, the removal of the lock nut assembly 10 is very simple with initially a spanner or other tool engaging nut 14 to unscrew the nut 14 from thread member 22, and then the same tool being used to unscrew nut 14 from thread member 22.

In the present embodiment the bolt 26 is shown as having a protruding hexagonal head 40. Thus a tool such as a spanner can also be used to hold the head 40 to prevent rotation of bolt 26 and further assist in removing the lock nut assembly 10. However the ease of removal of the lock nut assembly 10 is particularly advantageous in applications where a bolt needs replacement on a regular basis and the ability to access or tightly grip the head of the bolt is limited or otherwise restricted. One example of this is in the area of abrasion protection by use of replaceable wear plates as explained below with reference to FIGS. 5 and 6.

Figure 5:
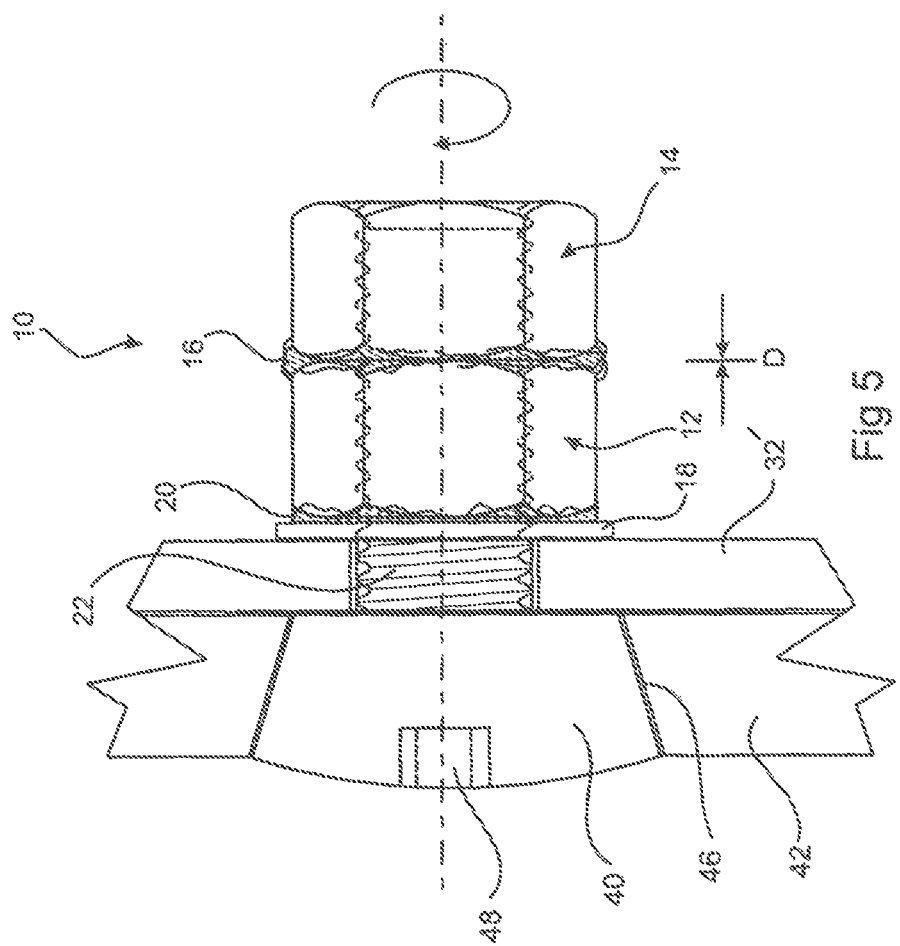
FIG. 5 illustrates the lock nut assembly when fully applied to a bolt holding a wear plate.

FIG. 5 depicts a wear plate 42 fastened to an inside surface of an ore bin 32' by a bolt 26' having a threaded shaft 22. In FIG. 5 the wear plate 42 and bolt 26' are in a "new" condition and not yet subject to wear. The bolt 26' has a head 40' which is of a frusto-conical shape and seated inside a complementary shaped recess 46 in the wear plate 42. The head 40' has a hexagonal socket 48 to receive a key to assist in holding the bolt 26' against rotation when applying the lock nut assembly 10. The lock nut assembly is applied to bolt 26' in exactly the same way as described above in relation to bolt 26.

Figure 6:
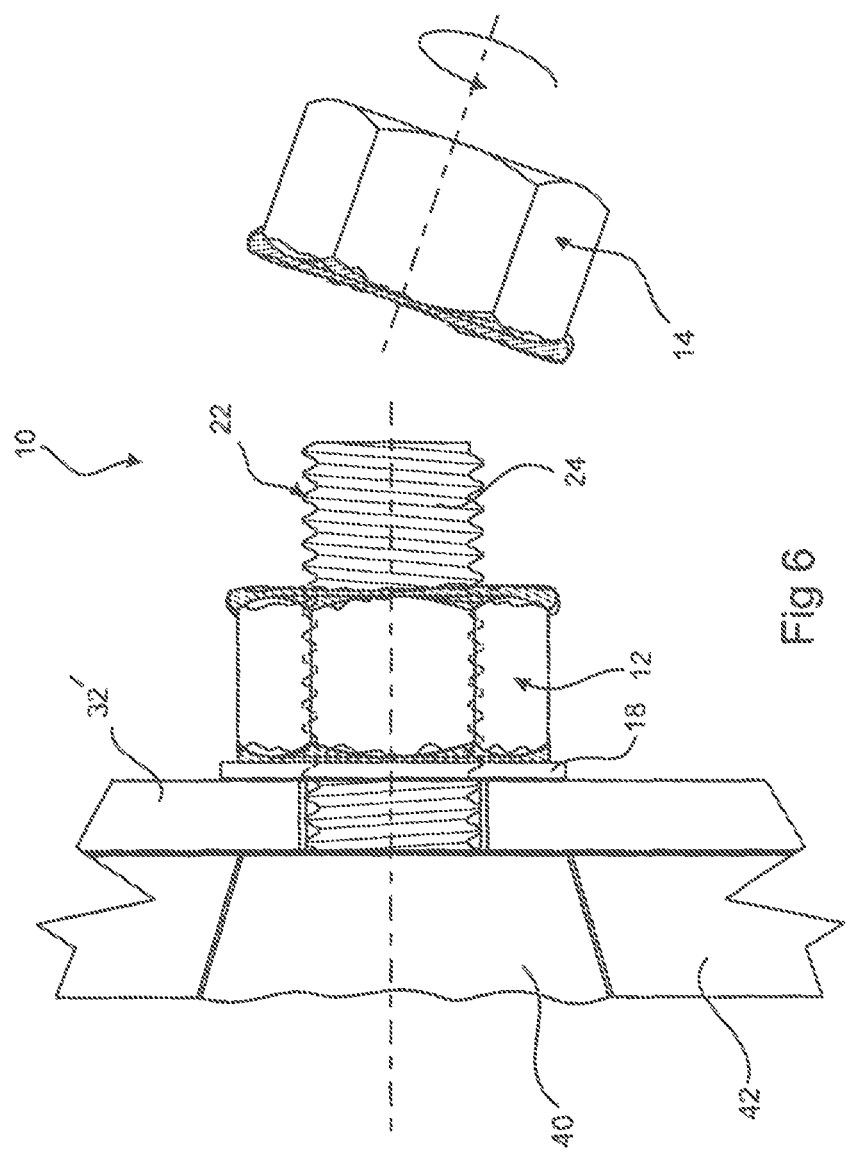
FIG. 6 illustrates the removal of the lock nut assembly form the bolt shown in FIG. 5 after wearing of the wear plate and bolt.

In many applications the wear plate 42 will need to be replaced on a regular basis, for example every three months. Usually the head 40' wears away at the same rate as the wear plate 42. As a consequence the depth of the socket 48 is substantially reduced or indeed completely obliterated. This is shown in FIG. 6. Thus the ability to hold the bolt 26' is compromised. In such circumstances it is of great benefit to ensure that the torque to unscrew any nuts on the shaft 22 of bolt 26' is not increased due to corrosion or other damage of the thread 24.

Embodiments of the lock nut assembly 10 are well suited to this application due to the protection provided by the assembly 10 to the shaft 22 of the bolt 26'. Consequently the lock nut assembly 10 can be removed much more easily than say a conventional double lock nut. This reduced the time taken to re-line an ore bin or other protected structure with wear plates and improves safety as the need to use a cutting device such as an angle grinder or oxy-acetylene torch in avoided. In this regard it should be understood that the structures which are protected with wear plates are usually very large and workers are required to work at elevated heights on ladders, scaffolding or in cherry pickers.

From the above description it will be understood this embodiment provides a unitary lock nut assembly in which two nuts (a primary nut 12 and a lock nut 14) can be simultaneously screwed onto a treaded member with the primary nut fully torqued using a single tool in one action. This arises because the material 16 allows the joined nuts to move axially relative to each other while being simultaneously rotated by the same socket/tool. This in turn enables the automatic alignment of the thread on the second nut with the thread on the threaded member.

Notwithstanding the above described specific embodiment of the lock nut assembly, it should be appreciated that this embodiment may be subject to many modifications and variations which do not alter its broad functionality. For example the second nut 14 may be itself in the form of a prevailing torque nut. In a further embodiment a third nut may be incorporated between the first and second nuts and joined by elastomeric material to the first and second nuts. Other variations include: providing the first/primary nut 12 as a "half nut" having half the axial length of the second nut 14; and/or providing the second nut as a dome nut. If the second nut is provided as a dome nut it can also be a prevailing torque dome nut. Also there is no need for the elastomeric material 16 to form a water proof seal between the nuts, either before or after application of the assembly 10 onto the member 22. In one variation the elastomeric material 16 may be provide for example as a plurality of circumferentially spaced apart portions, strands or bands between the nuts.

Figure 13:
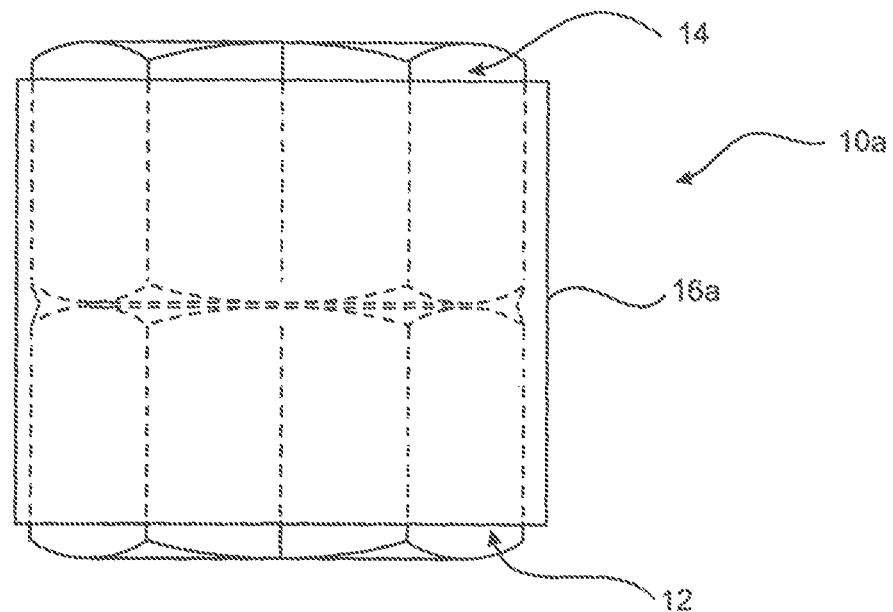
FIG. 13 illustrates a side view of a fourth embodiment of the lock nut assembly.
Figure 14:
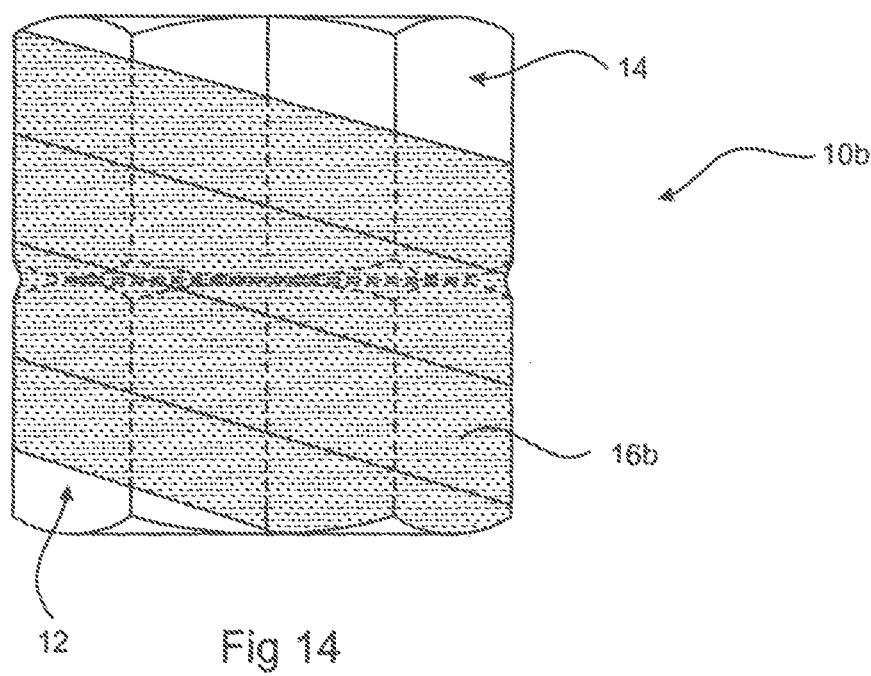
FIG. 14 illustrates a side view of a fifth embodiment of the lock nut assembly.

Also the material 16 may be provided in alternative forms to a volume of elastic material that is bonded to or between the nuts 12, 14. For example the material 16 may be provided as a pliable material or a frangible material detachably coupling the first and second components together about their outer radial surfaces with their holes in axial alignment. In such embodiments the nuts 12 and 14 need not be spaced by the distance D, i.e. D=0. Although of course the pliable or frangible material can be located between the axial faces of the components in which cad D=the thickness of the material. Non limiting examples of the pliable material or frangible material include: adhesive tape that can adhere the first and second components together, either about their outer radial surfaces or between their axial faces; and a sleeve made of a plastics material that fits over at least a portion of both the first and second components. In one example the sleeve may be a shrink wrap sleeve. A further example is a plastics tape or wrapping material such as plumbers tape (i.e. PVC tape) or cling wrap. A further example of the material is a double sided adhesive tape or other pliable material in the form or configuration of a washer that is located between and adhered to adjacent axial faces of the components. FIGS. 13 and 14 illustrate example of these embodiments.

In FIG. 13 a lock nut assembly 10a is shown having nuts 12 and 14 which are detachably coupled by material provided as a sleeve 16a made of a plastics material. The sleeve holds the nuts 12 and 14 together with sufficient friction so that the assembly 10a is and can be handled as a unity device while still enabling the nuts 12 and 14 to move axially relative to each other to facilitate engagement of the thread of nut 14 with the thread on the member 22. When removing the assembly 10a either the nut 14 and covering portion of the sleeve 16a can be engaged with a spanner or other unscrewing tool; or if desired the sleeve 16a or a portion thereof can be cuts off for example with a box cutter or other knife. The sleeve can provide waterproofing while it is retained in the assembly 10a.

In FIG. 14 a lock nut assembly 10b is shown having nuts 12 and 14 which are detachably coupled by material provided as a tape or strip of material 16b wound about the nuts 12, 14. The tape has at least one turn where the width of the tape spans both nuts 12, 14. The tape may be in the form for example of adhesive plastic tape similar to electrical tape, or it may take the form of PVC tape of a type commonly referred to as "plumbers tape". A further possibility it that the strip of material is a cling wrap such as commonly used to maintain freshness of food or wrap newspapers or boxes. Such cling wraps may be made from Polyvinylidene chloride (PVDC) or Low-density polyethylene (LDPE). Again such tape or wrap detachably couples the nuts together to facilitate application of the assembly 10b as a single unit while allowing relative axial motion of the nuts to enable alignment of the threads on the nut 14 and member 22. The tape is easily detached or broken by the torque applied during the tightening or subsequent removal of nut 14.

In the above variations of the assembly 10a and 10b the material 16a, 16b still operates to perform the same function as the elastic material 16. Specifically the material detachably holds the nuts 12 and 14 together so they can be applied simultaneously using a common tool. The material enables the second nut 14 to move axially with respect to the first nut 12 in the event that the start of its thread does not coincide with the start of the thread of the member 22 so that it will eventually engage the member 22 with continued screwing of the assembly.

Finally the material will detach or break away from the nuts 12 and/or 14 when releasing the assembly to enable the nut 14 to be removed separately.

FIGS. 7-12 depict further embodiments a lock nut assembly 10'. In describing these embodiments the same reference numbers will be used as for the first embodiment descried in relation to FIGS. 1a-6 to denote the same or similar features.

The lock nut 10' comprises a first component 12 and a second component 14. The first component 12 has a first axial through hole 17 provided with a screw thread 19. The screw thread 19 has a major diameter D1 and a minor diameter D2. The first component 12 is also configured to engage a tool such as a spanner or a socket to enable torquing of the component 12. This configuration is provided by way of a plurality of flat surfaces 28 formed about an outer surface of the first component 12. In this instance, the first component 12 is in form a hexagonal nut and accordingly has six flat surfaces 20.

The first component 12 is also formed with a coupling 23 that extends axially from one end. The coupling 23 has an inner surface 25 of a smallest inner diameter Dx greater than the D1. A screw thread 27 is formed on the inner surface 25. The screw thread 27 has the same sense as thread 19 and same pitch. In addition the thread 27 is of a relatively shallow depth in comparison to the thread 19 and has a radiused crest and root.

The second component 14 of lock nut assembly 10' is also configured to engage a tool such as a spanner or socket by provision of a plurality of outer flat surfaces 30. There are six flat surfaces 30. The flat surfaces 30 are aligned with corresponding flat surfaces 28 on the first component 12.

The second component 14 is also provided with a second axial hole 31 which is contiguous with the first axial hole 17. A locking portion 33 of the second hole 31 has an inner diameter D3 which is less than the major diameter D1. Further, the second component 14 is made from a deformable and more particularly an elastically deformable material such as, but not limited to plastics materials including Nylon™ material.

In one aspect the diameter D3 is less than the major diameter D1, i.e. D3<D1. In a second aspect the D3 may be greater than or equal to the minor diameter D2, i.e. D3≥D2. Thus in one embodiment D1>D3≥D2. Accordingly in one possible embodiment D3=D2.

The second axial hole 31 also has a portion 35 contiguous with the locking portion 33. Portion 35 has an inner diameter D4 which is greater than the minor diameter D2. In this specific embodiment illustrated in the accompanying drawings the diameter D4 equals the major diameter D1. In alternate embodiments (which are not illustrated) D4 may be greater than D1.

The portion 35 of a second axial hole 31 extends from the locking portion 33 to an end 37 of the second component 14 distant the first component 12.

Figure 8:
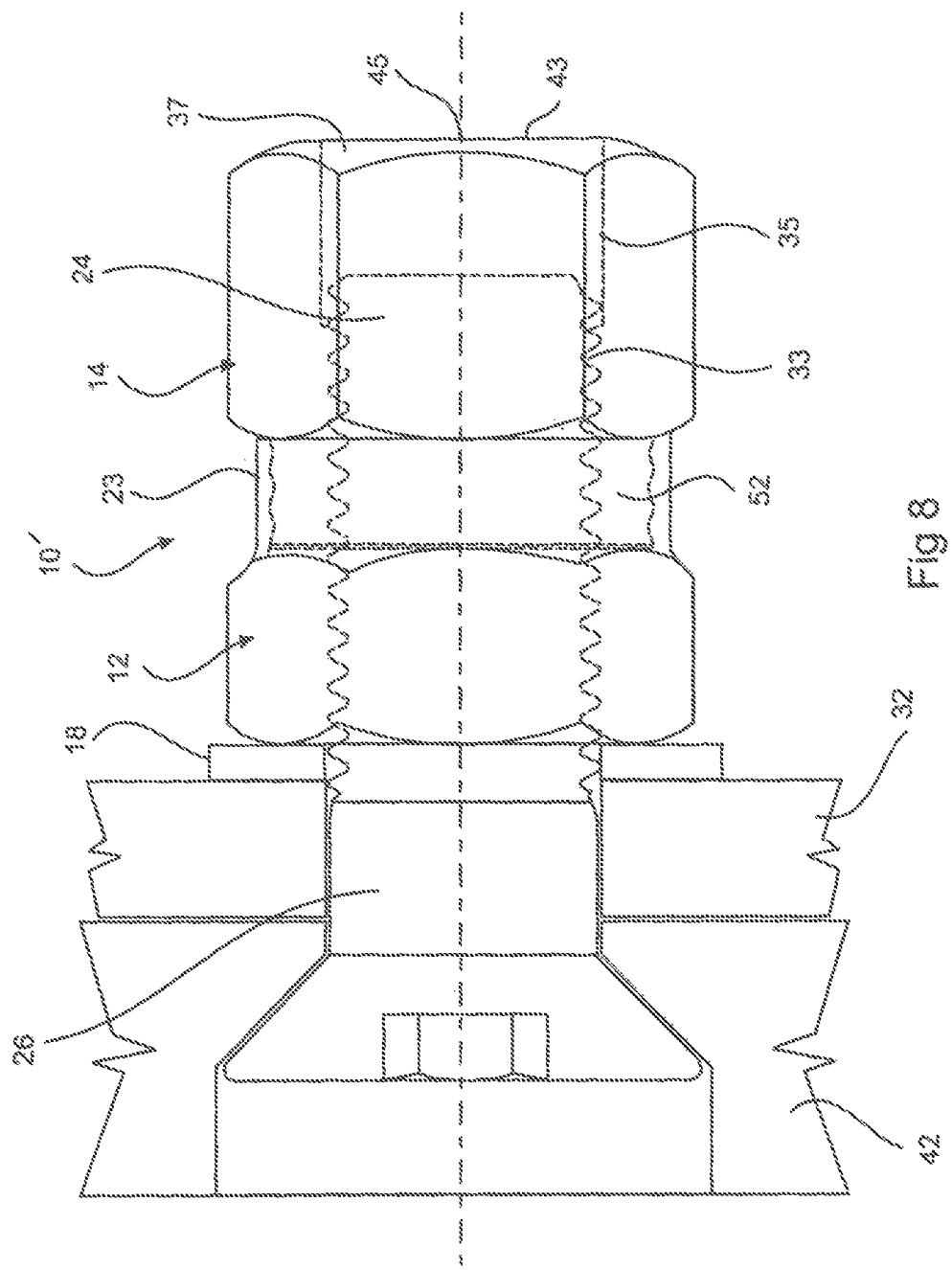
FIG. 8 shows the lock nut of FIG. 7 coupled to a bolt and used for securing a wear plate to a structure.

With particular reference to FIG. 8, the second component 14 of lock nut 10' is configured to enclose an end of a thread shaft 24 onto which the lock nut 10' is screwed. This is achieved by providing a closure member 43 in the form of a web or wall which extends radially across end 37 of second component 14. Closure 43 is provided with a breather hole 45 to enable the escape of fluids such as air from between the end of threaded shaft 24 and the lock nut 10' when lock nut 10' is screwed down onto the shaft 24. Alternately the closure may be provided with a one way valve, such a simple flap valve that enables the escape of fluids such as air from between the end of threaded shaft 24 and the lock nut 10'.

In FIG. 8, the thread shaft 24 is a shaft of a bolt 26. The bolt 26 and lock nut 10' are represented in use holding wear plate 42 to the structure 32. However specific application of the lock nut 10' and bolt 26 is immaterial to the structure and function of the lock nut 10'.

Figure 7:
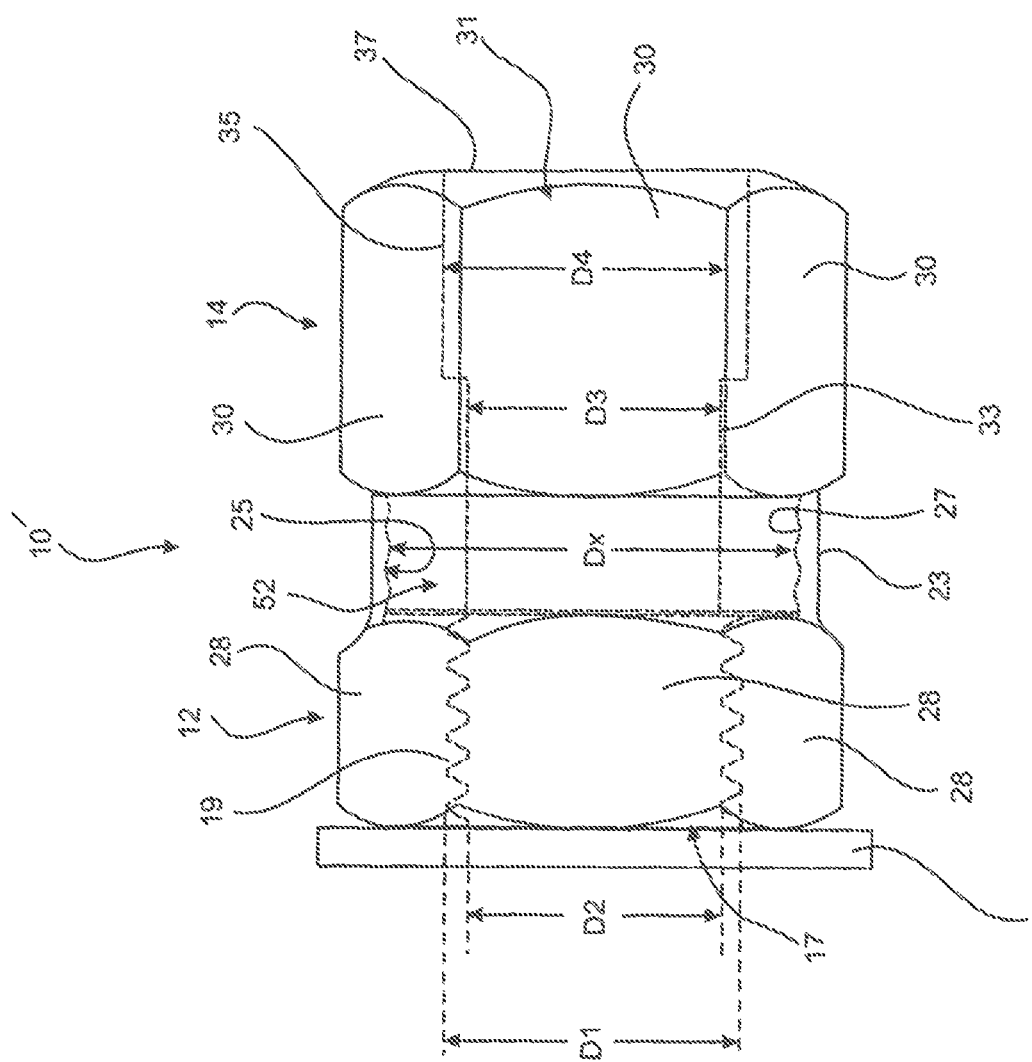
FIG. 7 shows a side view of a second embodiment of a lock nut assembly.
Figure 9:
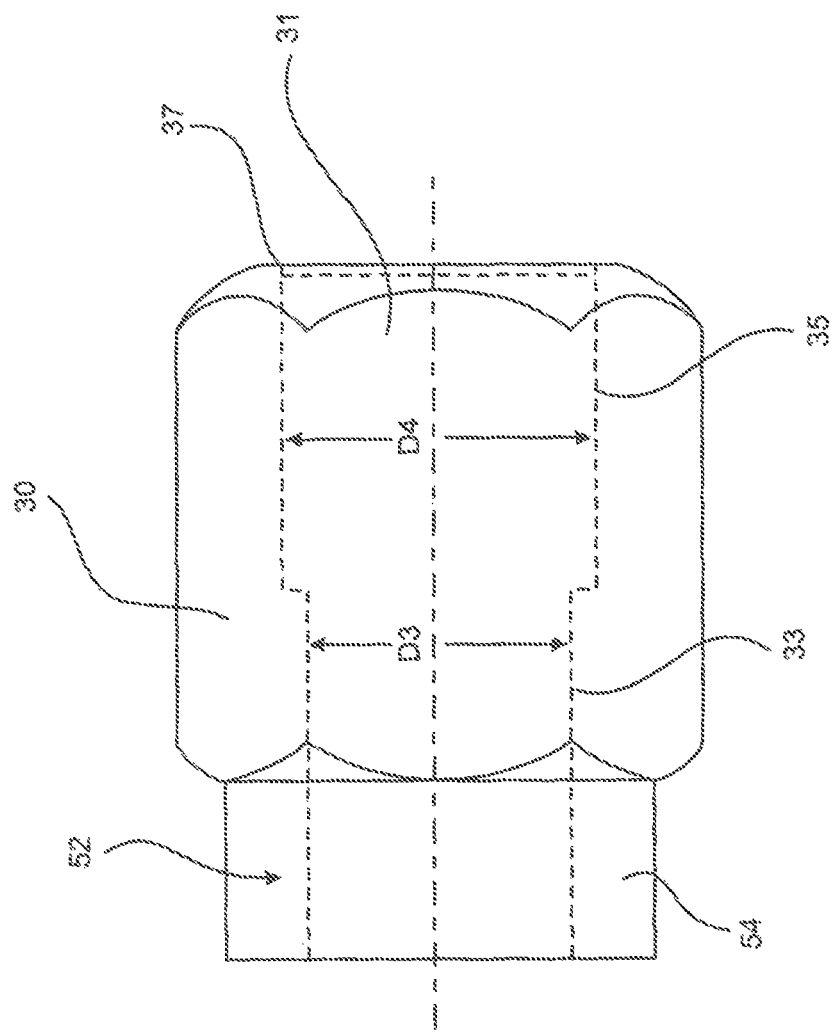
FIG. 9 shows a side view of a second part of the lock nut shown in FIG. 7.

With reference to FIGS. 7 and 9 the second component 14 comprises a coupling portion 52 which extends axially from an end opposite end 37. The locking portion 33 of the second axial hole 31 extends to axially through coupling portion 52.

In the lock nut 10', the first component 12 and second component 14 are demountably coupled together in the manner wherein rotation of the second component 14 in an unscrewing direction relative to the first component 12 facilitates the decoupling of the components 12 and 14.

The demountable coupling is facilitated by the inter-fitting of the coupling portions 23 and 52. More particularly, the coupling portion 52 fits into the coupling portion 23. The coupling portion 52 has an outer circumferential surface 54 which initially is smooth and of constant outer diameter.

In one embodiment when assembling the lock nut 10', the outer diameter of the second portion 52 is the same as or smaller than the minor diameter Dx of the thread 27. This enables the coupling portion 52 to fit inside the coupling portion 23 with either a light interference fit or with a small clearance. Thereafter, the coupling portion 23 is crimped or pressed onto the coupling portion 52. As the second component 14 is made of a deformable material this results in a complementary thread being pressed or formed on the outer circumferential surface 54. The first component 12 is made from a metal which facilitates or otherwise enables crimping or pressing of the coupling portion 23 onto the coupling portion 52.

In the illustrated embodiment washer 18 is attached to an end of the first component 12 distant the second component 14. The washer 18 may be attached by any suitable means such as gluing.

Prior to application of the lock nut assembly 10' onto a threaded shaft 24 a volume of an anti-corrosion substance such as grease may be placed inside the lock nut assembly 10'.

When applying the lock nut assembly 10' to the shaft 24 the lock nut assembly 10' is placed in a socket of a tool such as a hand wrench or rattle gun. This is facilitated by the flat faces 28 and 30 being mutually aligned. Thus when the lock nut assembly 10' is initially applied the tool applies torque to both components 12 and 14 simultaneously to screw the nut assembly 10' down onto the shaft 24. As this is occurring, fluid such as air and anti-corrosion substance in the lock nut assembly 10' can escape through the breather hole 45. As the nut assembly 10' is being screwed onto the shaft 24 initially the thread on the shaft 24 engages the thread 19 in the first component 12. However when the shaft 24 reaches the end of thread 19 continued screwing of the lock nut assembly 10' results in the shaft 24 commencing to cut, tap or otherwise deform a thread into the locking portion 33 of the second axial hole 31 in the second component 14. This action continues until the lock nut assembly 10' is fully screwed down onto the shaft 24. Depending on the relative size of the shaft 24 and the portions 33 and 35 of the second axial hole 31, the shaft 24 may eventually enter into the portion 35. In the event that the portion 35 has an inner diameter D4≥D1 the shaft 24 enters without forming a thread in the portion 35.

The action of the thread on shaft 24 cutting, tapping or otherwise deforming a thread into the locking portion 33 of second component 14 has the effect of locking the nut assembly 10' onto the shaft 24. This effect is the same as that of a prevailing torque nut such as a Nyloc™ nut.

As the lock nut assembly 10' is configured to wholly enclose the shaft 24 the thread of the shaft 24 is now protected from corrosion and other damage such as impact damage.

The prescribed torque for any particular application of nut assembly 10' is applied via the first component 12 which is made of metal. The second component 14 provides the "locking" feature or action, as well as provides protection to the thread of shaft 24.

Figure 10:
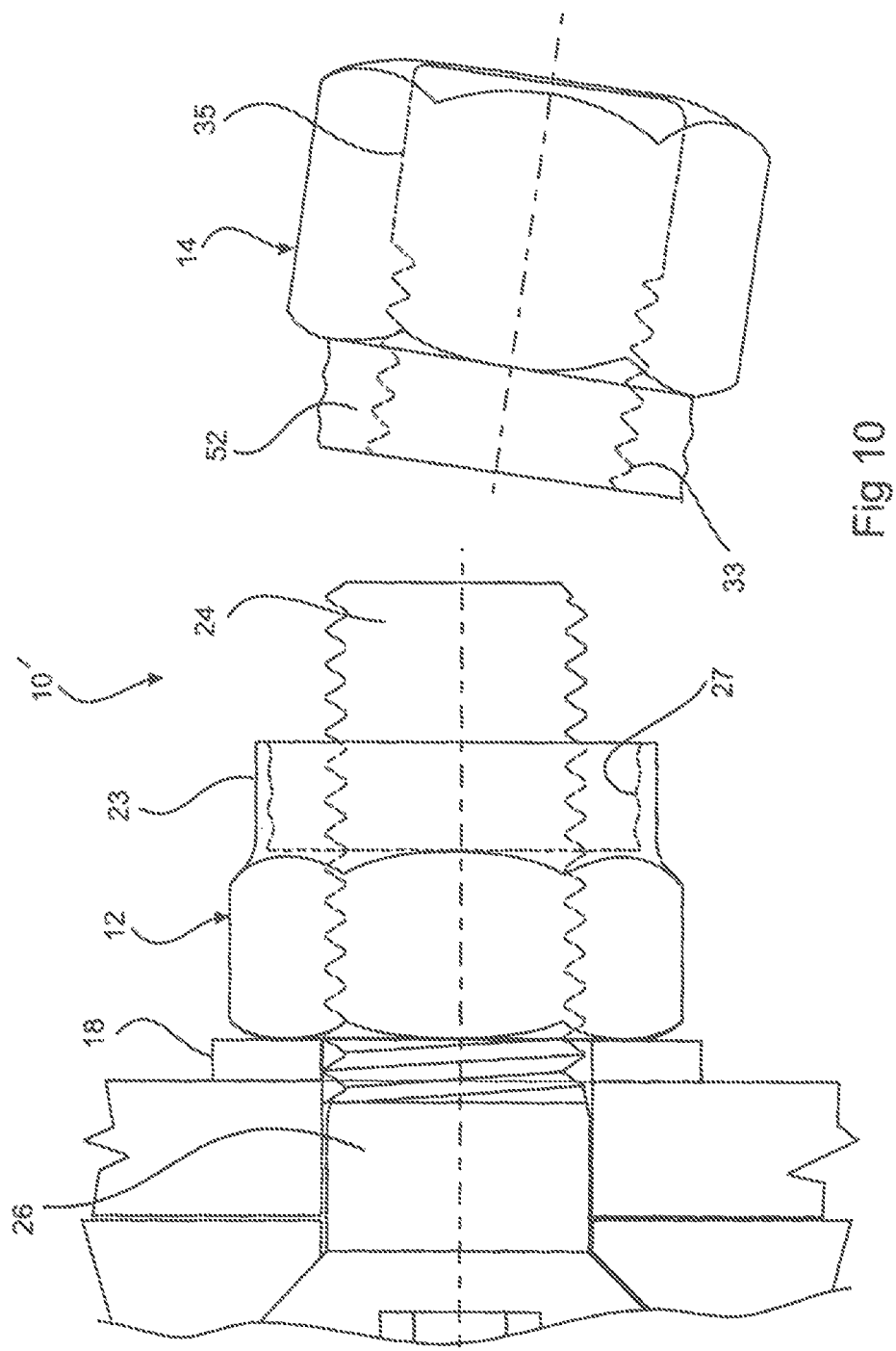
FIG. 10 shown the lock nut partially removed from the bolt shown in FIG. 7.

FIG. 10 illustrates the partial releasing of lock nut assembly 10' from bolt 26. When undoing the lock nut assembly 10', initially a tool is engaged with the second component 14. The tool is operated to apply torque in the direction to unscrew the second component 14 from the thread of the bolt 26 as well as thread 27 of the coupling portion 23. Once the component 14 is removed, the same tool can be used to engage the first component 12 to unscrew it from the bolt 26. As the thread on the shaft 24 has been protected by the lock nut assembly 10' it is in visage that the maximum torque required to unscrew the first component 12 will be at most the initial applied torque.

Figure 11:
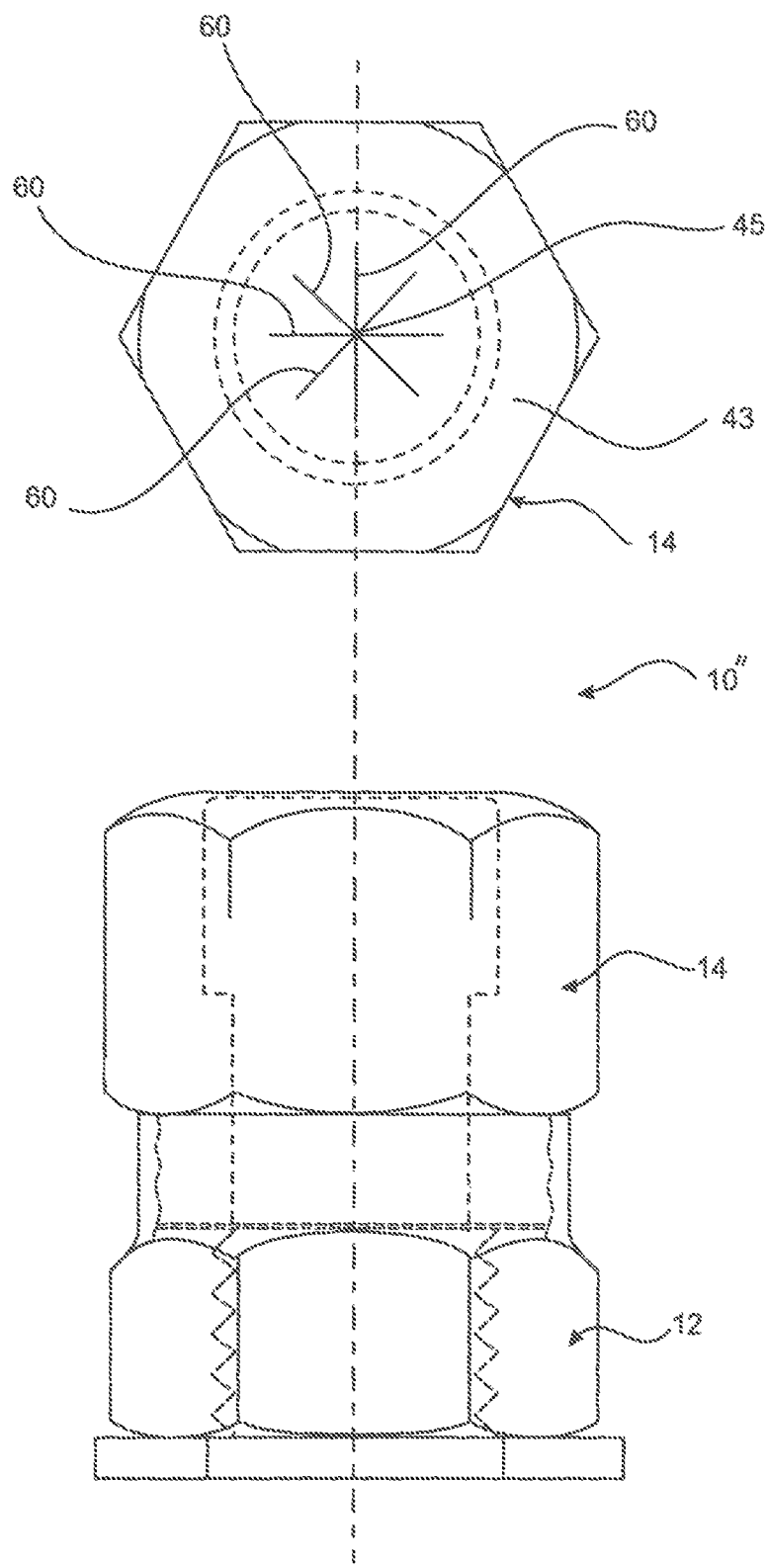
FIG. 11 illustrates a side and end view of a third embodiment of the lock nut.
Figure 12:
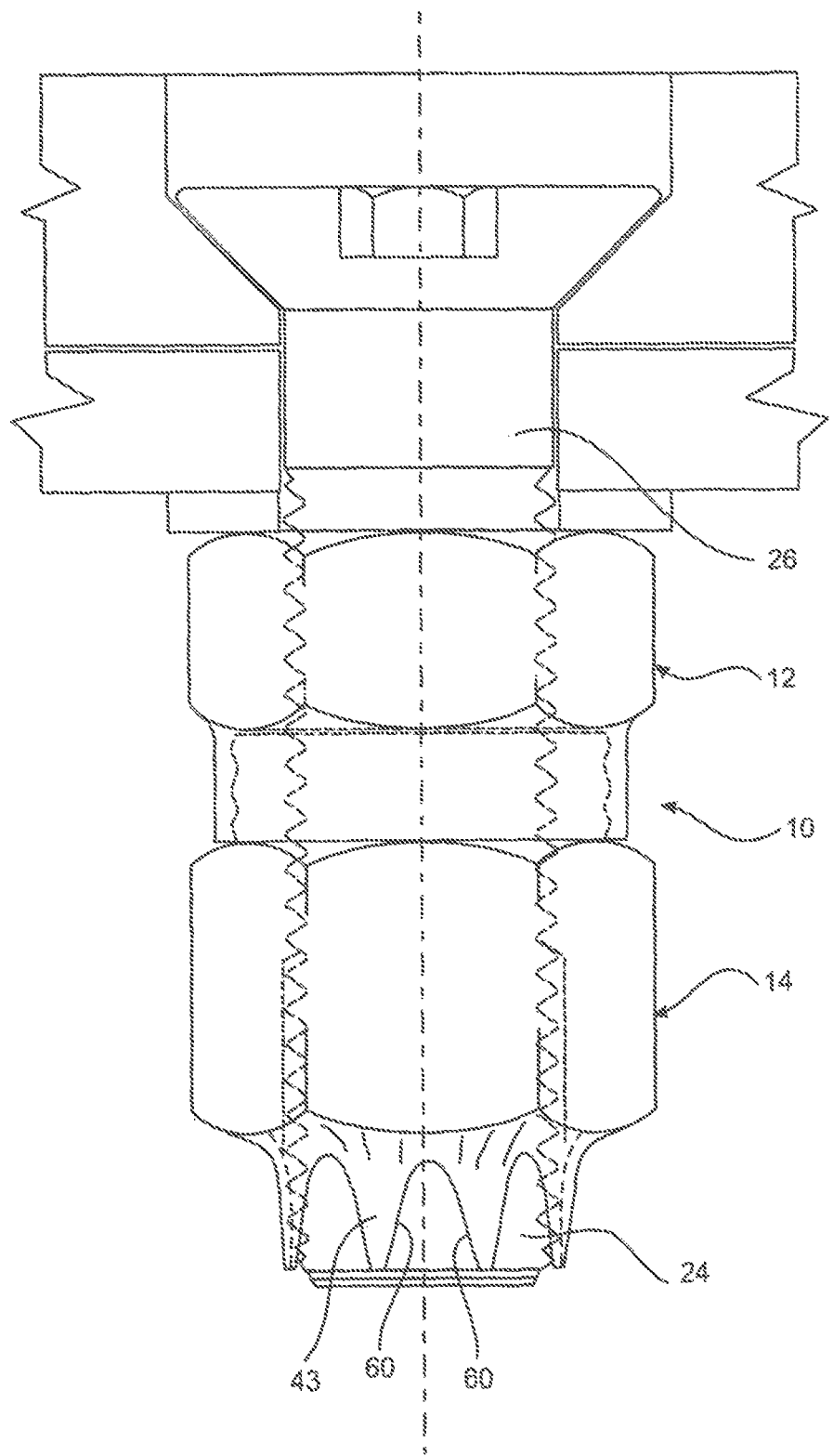
FIG. 12 illustrates the lock nut of FIG. 11 coupled to a bolt and used for securing a wear plate to a structure.

FIGS. 11 and 12 show a further embodiment of a lock nut assembly 10" where the same reference numbers are used to denote the same features as in the embodiment shown in FIGS. 7-10. The lock nut 10" differs from the lock nut 10' only by way of the provision of a number of lines of weakness 60 in the closure member 43. The lines of weakness 60 radiate from and are equally spaced the breather hole 45. The lines 60 may be formed by scoring the closure member 45 or indeed cutting through the whole thickness of the closure member 43.

The function of the lines of weakness 60 it to facilitate the bursting of the closure member by the shaft 24 in a controlled manner in the event that a length of the shaft 24 onto which the lock nut assembly 10" is screwed down is longer than the lock nut assembly 10". This is shown in FIG. 12 where the end of the shaft 24 is shown as bursting through the closure member 43.

Now that embodiments of the lock nut assemblies 10' and 10" have been described in detail it will be apparent those skilled in the relevant arts that numerous modifications and variations may be made without departing from the basic inventive concepts. For example the coupling portion 23 is described as being provided with a thread 27 which ultimately forms a corresponding thread on the outer surface of coupling portion 52. However in an alternative arrangement it is envisaged that an inner circumferential surface of the coupling component 23 can be formed with a constant inner diameter and at the demountable coupling between the first and second components 12 and 14 facilitated by simple interference fit of the coupling portion 52 in the coupling portion 23. Alternatively, adhesive or an adhesive sealant may now be applied between the coupling portions 23 and 52 to facilitate the demountable coupling of the components 12 and 14. Also the component 14 can be formed with multiple alternating locking portions 33 and 35, rather than only one of each. When releasing the lock nut assembly 10' or 10" it may be possible in some instances to unscrew the first and second components 12, 14 together using a single socket particularly if the head of the bolt 26 can be gripped. In yet a further variation the components 12 and 14 may take the form of nuts other than a hexagonal nut for example a square nut having four flat surfaces 28 and 30; or an octagonal nut having eight flat surfaces 28 and 30. All such modifications and variations together with others that would be obvious to persons who are skilled in the art are deemed to be within the scope of the invention the nature which is to be to be determined from the above description and the depending claims.

The invention claimed is:

1. A lock nut assembly comprising:
   a first component provided with a threaded axial through hole and a coupling portion extending axially from one end; and
   a second component provided with an axial hole, wherein the second component has a coupling portion which extends axially from one end of the second component, and a locking portion, wherein a portion of the axial hole extends from the locking portion to the one end, the locking portion being arranged to elastically deform on engagement with a threaded member;
   the first and second components being detachably coupled together by inter-fitting of the coupling portions and arranged so that both components when coupled together are simultaneously engagable with a common tool to effect application of the assembly onto a threaded member by operation of the tool to impart torque to the assembly in a first direction with the first component initially engaging the threaded member and the second component acting to lock the first component by elastic deformation of the locking portion on the threaded member and wherein the second component is able to be removed from the threaded member and detached from the first component by rotation in a direction opposite to the first direction.

2. The lock nut assembly according to claim 1 wherein the lock nut assembly is configured to wholly cover a threaded member onto which the lock nut assembly is to be applied.

3. The lock nut assembly according to claim 1 wherein the second component comprises a closure member over an end distant the first component.

4. The lock nut assembly according to claim 3 wherein the closure member is provided with a breather hole or a valve to enable escape of fluid from between the lock nut assembly and a threaded shaft onto which the lock nut assembly is screwed down.

5. The lock nut assembly according to claim 3 and wherein the closure member is provided with one or more lines of weakness arranged to enable rupturing of the closure member along the lines of weakness by the threaded member when a portion of the threaded member onto which the lock nut assembly is screwed down is greater than a length of the lock nut assembly.

6. The lock nut assembly according to claim 1 wherein a thread of the threaded axial through hole has a major diameter D1 and a minor diameter D2 where D1>D2, and a locking portion of the axial hole in the second component has an inner diameter D3<D1.

7. The lock nut assembly according to claim 6 wherein D3≥D2.

8. The lock nut assembly according to claim 6 wherein the axial hole in the second component has a further portion of an inner diameter D4>D3.

9. The lock nut assembly according to claim 1 comprising a washer attached to an end of the first component distant the second component.

10. The lock nut assembly of claim 1 wherein the coupling portion of the second component has a smaller outer diameter than that of the coupling portion of the first component.

11. The lock nut assembly of claim 10 wherein the first and second components are detachably coupled together by fitting of the coupling portion of the second component inside the coupling portion of the first component.

12. A lock nut assembly comprising:
   a first component provided with a threaded axial through hole; and
   a second component provided with an axial hole;
   the first and second components being detachably coupled together and arranged so that both components are simultaneously engagable with a common tool to effect application of the assembly onto a threaded member by operation of the tool to impart torque to the assembly in a first direction with the first component initially engaging the threaded member and the second component acting to lock the first component on the threaded member and wherein the second component is able to be removed from the threaded member and detached from the first component by rotation in a direction opposite to the first direction; and
   wherein the second component comprises a closure member over an end distant the first component, the closure member being provided with a breather hole or a valve to enable escape of fluid from between the lock nut assembly and a threaded shaft onto which the lock nut assembly is screwed down.

13. A lock nut assembly comprising:
   a first component provided with a threaded axial through hole; and
   a second component provided with an axial hole;
   the first and second components being detachably coupled together and arranged so that both components are simultaneously engagable with a common tool to effect application of the assembly onto a threaded member by operation of the tool to impart torque to the assembly in a first direction with the first component initially engaging the threaded member and the second component acting to lock the first component on the threaded member and wherein the second component is able to be removed from the threaded member and detached from the first component by rotation in a direction opposite to the first direction
   wherein a thread of the threaded axial through hole has a major diameter D1 and a minor diameter D2 where D1>D2, and a locking portion of the axial hole in the second component has an inner diameter D3<D1, wherein the locking portion is arranged to elastically deform on engagement with the threaded member.

* * * * *